(12) United States Patent
Zhao et al.

(10) Patent No.: US 10,382,751 B1
(45) Date of Patent: Aug. 13, 2019

(54) TRANSPARENT, FINE-GRAINED AND ADAPTIVE DATA COMPRESSION

(71) Applicant: EMC IP Holding Company LLC, Hopkinton, MA (US)

(72) Inventors: Junping Zhao, Beijing (CN); Kenneth J. Taylor, Franklin, MA (US); Lin Peng, Beijing (CN); Kun Wang, Beijing (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 277 days.

(21) Appl. No.: 15/638,442

(22) Filed: Jun. 30, 2017

(51) Int. Cl.
*G06F 15/16* (2006.01)
*H04N 19/105* (2014.01)
*H04L 29/06* (2006.01)

(52) U.S. Cl.
CPC ........... *H04N 19/105* (2014.11); *H04L 69/04* (2013.01); *G06F 15/16* (2013.01)

(58) Field of Classification Search
CPC ....... H04N 19/105; H04L 69/04; H03M 7/30; H03M 7/3091; H03M 7/3084
USPC ....................................................... 709/247
See application file for complete search history.

(56) References Cited

U.S. PATENT DOCUMENTS

| | | | | |
|---|---|---|---|---|
| 10,037,161 | B2 * | 7/2018 | Imaeda | G06F 3/0604 |
| 2011/0035376 | A1 * | 2/2011 | Kirshenbaum | G06F 16/137 707/737 |
| 2013/0111164 | A1 * | 5/2013 | Chang | H03M 7/3091 711/162 |
| 2017/0308437 | A1 * | 10/2017 | Usvyatsky | H04L 69/40 |
| 2018/0349053 | A1 * | 12/2018 | Battaje | G06F 3/0641 |

* cited by examiner

*Primary Examiner* — Frantz B Jean
(74) *Attorney, Agent, or Firm* — Dergosits & Noah LLP; Todd A. Noah

(57) ABSTRACT

Transparent, fine-grained, and adaptive data compression is described. A system determines a first data chunk and a second data chunk in a persistent storage. The system determines a first data read count and/or a first data write count for the first data chunk, and a second data read count and/or a second data write count for the second data chunk. The system determines then a first data compression status for the first data chunk and a second data compression status for the second data chunk. Based on the first data compression status and second data compression status, the system stores data in the first data chunk and data in the second data chunk to the persistent storage.

20 Claims, 5 Drawing Sheets

TRANSPARENT, FINE-GRAINED AND ADAPTIVE DATA COMPRESSION

BACKGROUND

Enterprises generate and store increasingly vast amounts of data. Techniques used to store these vast amounts of data include data compression, which is a procedure that encodes information using less storage space than the original representation of the information. Data compression enables better storage efficiency, and reduces the amount of data written to persistent storage (such as a volume, a volume pool, a data structure, a storage area network, a network attached storage, a cloud storage, or a file system) which may be important in prolonging the lifespan of the persistent storage. Since implementing data compression usually causes a negative impact on a data-accessing system's performance, optimal system design considers relevant factors, such as which data should be compressed in persistent storage.

An example of a data compression technique is data deduplication, which reduces storage needs and network transfer size by eliminating duplicate copies of repeating data. A backup/restore application is one example in which data stored by a client device is de-duplicated. If a software error corrupts a data object, or if erroneous data updates the data object, a data protection administrator may restore the data object to a previous state that does not include the corrupted or erroneous data. A backup/restore application executes a backup operation either occasionally or continuously to enable this restoration, storing a copy of each desired data object state (such as the values of data and these values' embedding in a database's data structures) within dedicated backup files. Data deduplication significantly reduces backup time by only storing unique periodic changes, while maintaining full backups for restoration. The transmission of a de-duplicated backup sends only changed data, thereby reducing network traffic. When the data protection administrator decides to return a data object to a previous state, the data protection administrator specifies the desired previous state by identifying a desired point in time when the data object was in this state, and instructs the backup/restore application to execute a restore operation to restore a copy of the corresponding backup files for that state to the data object.

A data object may be stored on a storage array, which is a disk storage system that includes multiple disk drives. Unlike a disk enclosure, a storage array has cache memory and advanced functionality, such as virtualization and Redundant Array of Independent Disks (RAID). A data protection administrator may manage a backup/restore application to create backups files of data objects and store the backup files of data objects on multiple storage arrays.

DETAILED DESCRIPTION

Figure 1:
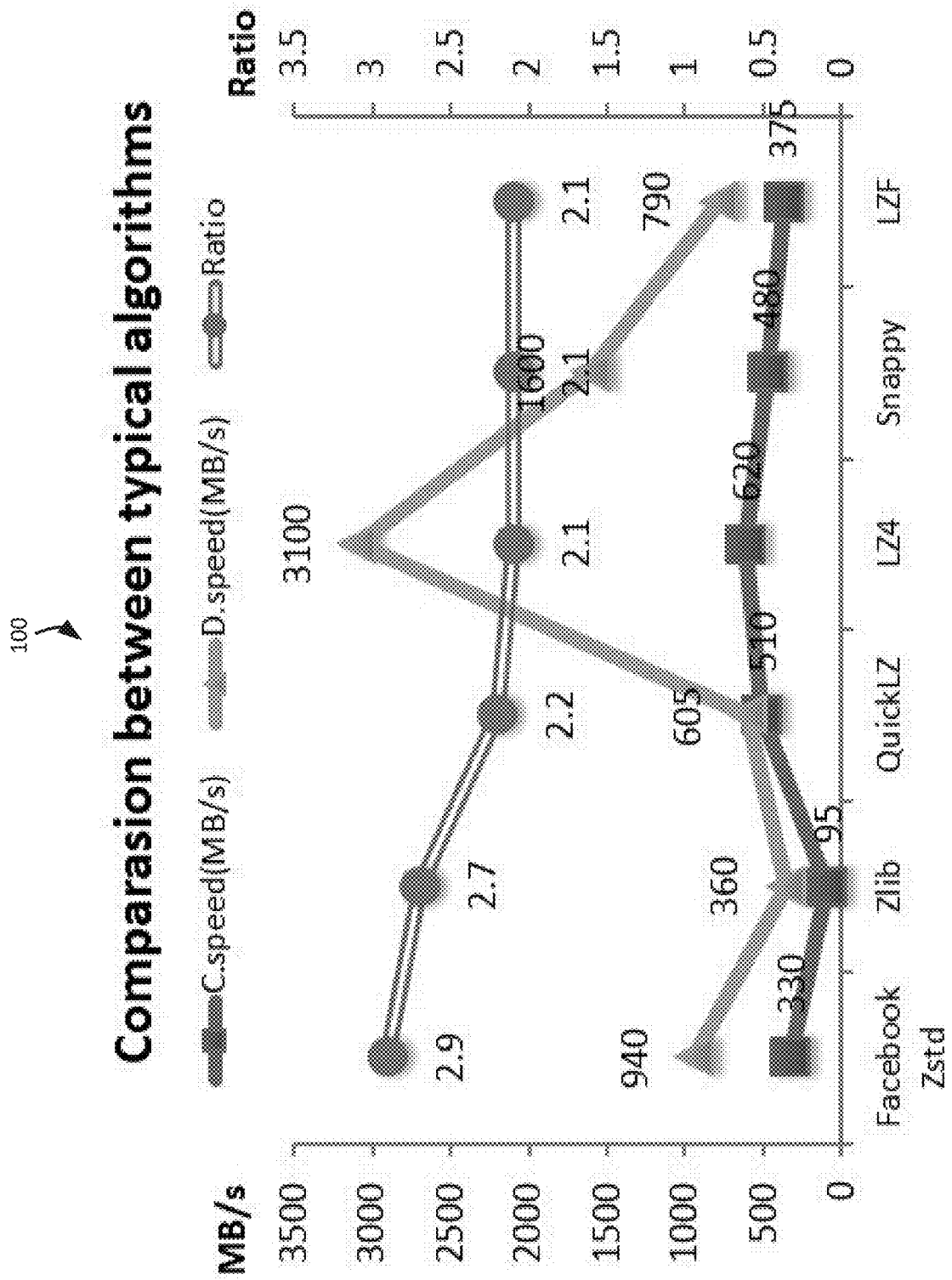
FIG. 1 illustrates a graph depicting comparisons between data compression algorithms.

Optimal data compression requires consideration of data compression algorithms and the data to be compressed. Vendors may offer many different data compression algorithms, and each data compression algorithm may have its optimization or design rules. Usually a data compression algorithm trades off between performance (which includes data compression speed and data decompression speed) and data compression ratios. FIG. 1 illustrates a graph 100 that depicts comparisons between data compression algorithms. As depicted in the graph 100, the 6 example data compression algorithms have data compression ratios (referenced as "ratio") that can differ more than 38%, data compression speeds (referenced as "C speed") that can differ more than 550%, and data decompression speeds (referenced as "D speed") that can differ more than 760%. Consequently, the selection of a data compression algorithm has a significant impact on a system's storage efficiency due to the data compression ratio, the system's data read performance due to the data decompression speed, and the system's data write performance due to the data compression speed.

Many different patterns of data access may coexist in the same persistent storage. A first range of stored data may be accessed relatively frequently, a second range of stored data may be accessed relatively infrequently, a third range of stored data may be initially accessed relatively frequently before being accessed relatively infrequently, and a fourth range of stored data may be initially accessed relatively infrequently before being accessed relatively frequently. Therefore, a data compression algorithm needs to be selected to match the data to be compressed to achieve optimal data compression ratios and performance.

However, vendors of data compression algorithms may assume that one data compression algorithm will satisfy all needs of a data compression algorithm's user, such as an end-user or a system administrator. Consequently, a vendor may offer a single data compression algorithm that the user enables with static parameters, such as data compression on or off, a data compression level, and a data compression granularity. While such a data compression algorithm may be simple to implement, it may not be optimal for either data compression ratios or the user's system performance. Since both a vendor and a user may lack sufficient insight to determine which data compression algorithm is optimal for the user's system, the vendor and/or the user may engage in testing. However, testing can still result in the selection of a non-optimal data compression algorithm for the user's system, especially if the data access patterns differ between the test environment and the user's system. Furthermore, even if the optimal data compression algorithm is selected for the initial data access patterns in a user's system, the selected data compression algorithm may no longer be optimal when data access patterns change in the user's system.

Embodiments herein provide transparent, fine-grained, and adaptive data compression. A system determines a first data chunk and a second data chunk in a persistent storage. The system determines a first data read count for the first data chunk and/or a first data write count for the first data chunk, and a second data read count for the second data chunk and/or a second data write count for the second data chunk. The system determines a first data compression status for the first data chunk, based on the first data read count and/or the first data write count. The system determines a second data compression status for the second data chunk, based on the second data read count and/or the second data write count, the second data compression status differing from the first data compression status. The system stores, based on the first data compression status, data in the first data chunk to the persistent storage. The system stores, based on the second data compression status, data in the second data chunk to the persistent storage.

For example, a data compression optimizer groups data files 10-19 as a first data chunk, data files 20-29 as a second data chunk, data files 30-39 as a third data chunk, and data files 40-49 as a fourth data chunk in the data stored by a disk. The data compression optimizer counts the data reads and the data writes for the data files 10-19, the data reads and the data writes for the data files 20-29, the data reads and the data writes for the data files 30-39, and the data reads and the data writes for the data files 40-49. The data compression optimizer determines that the LZ4 data compression algorithm is optimal for the data files 10-19 due to their relatively high read count, the LZ4 data compression algorithm is optimal for the data files 20-29 due to their relatively high write count, the Zlib data compression algorithm is optimal for the data files 30-39 due to their relatively low read and write counts, and no data compression is optimal for the data files 40-49 in the fourth data chunk due to its relatively high read and write counts combined with its relatively low average data compression ratios. The data compression optimizer launches new dedicated background threads that use the LZ4 data compression algorithm to retrieve, recompress, and store the data files 10-19 and the data files 20-29, use the Zlib data compression algorithm to retrieve, recompress, and store the data files 30-39, and use no data compression algorithm to retrieve, recompress, and store the data files 40-49.

Figure 2:
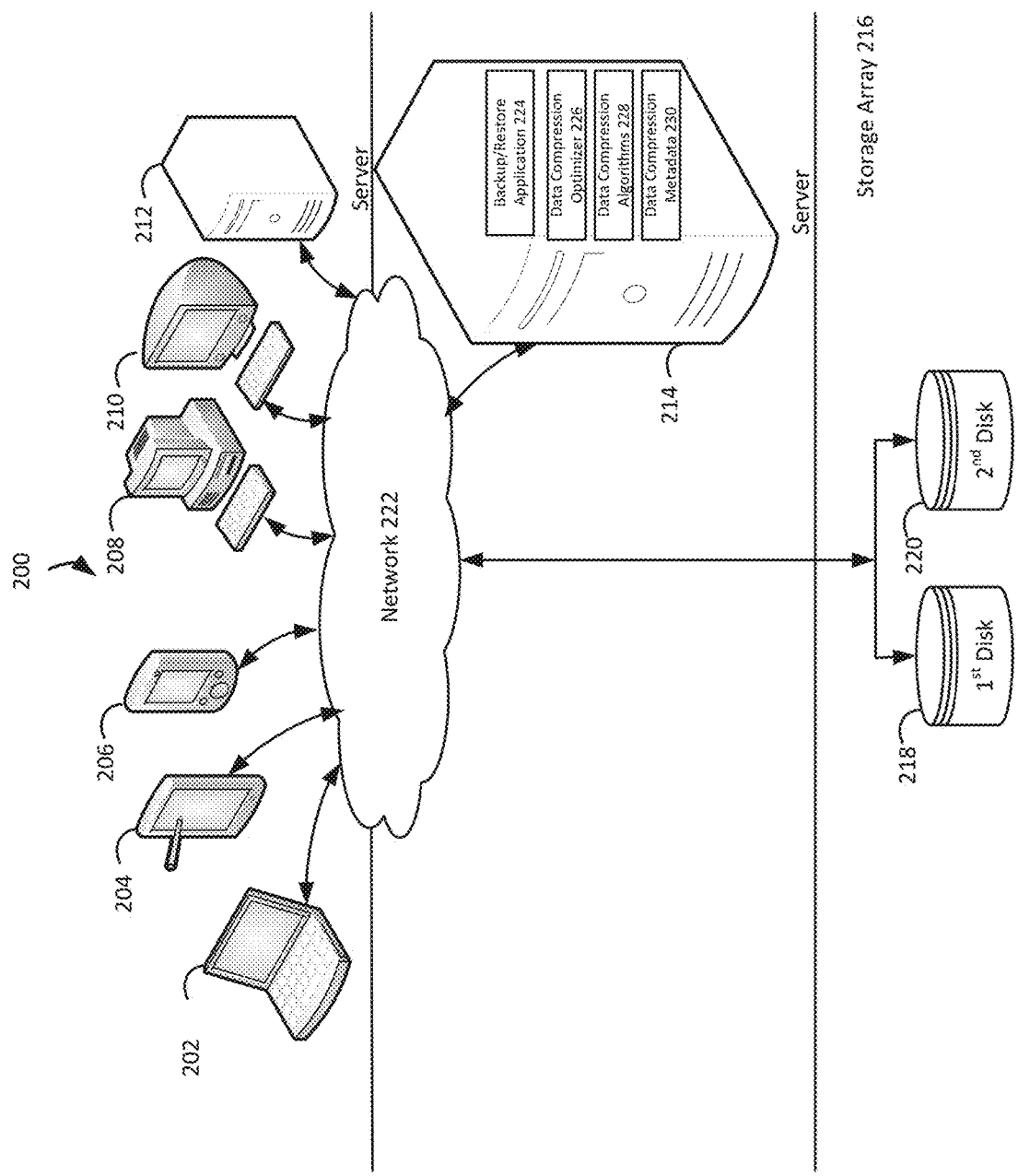
FIG. 2 illustrates a block diagram of an example system for transparent, fine-grained, and adaptive data compression, under an embodiment.

FIG. 2 illustrates a diagram of an example of a system that implements transparent, fine-grained, and adaptive data compression, under an embodiment. As shown in FIG. 2, a system 200 may illustrate a cloud computing environment in which data, applications, services, and other resources are stored and delivered through shared data-centers and appear as a single point of access for the users. The system 200 may also represent any other type of distributed computer network environment in which servers control the storage and distribution of resources and services for different client users.

In an embodiment, the system 200 represents a cloud computing system that includes a first client device 202, a second client device 204, a third client device 206, a fourth client device 208, a fifth client device 210, and a sixth client device 212; and a server 214 and a storage array 216 that may be provided by a hosting company. Although FIG. 2 depicts the first client 202 as a laptop computer 202, the second client 204 as a tablet computer 204, the third client 206 as a smartphone 206, the fourth client 208 as a personal computer 208, the fifth client 210 as an iMac computer 210, and the sixth client 212 as a server 212, each of the clients 202-212 may be any type of computer. The storage array 216 includes a first disk 218 and a second disk 220. The clients 202-212, the server 214, and the storage array 216 communicate via a network 222. Although FIG. 2 depicts the system 200 with six clients 202-212, one server 214, one storage array 216, two disks 218-220, and one network 222, the system 200 may include any number of clients 202-212, any number of servers 214, any number of storage arrays 216, any number of disks 218-220, and any number of networks 222. The clients 202-212 and the server 214 may each be substantially similar to the system 500 depicted in FIG. 5 and described below.

The server 214 includes a backup/restore application 224 that can create backup files of data objects for the clients 202-212, and execute a rollback based on the backup files. The backup/restore application 224 may provide centralized administration, such as scheduling, monitoring, and managing backup operations and backup files. The backup/restore application 224 enables the storing of backup operation schedules, client policies, and client configurations. The backup/restore application 224 can provide a unique interface to the clients 202-212 during login, and assist the server 214 in authenticating and registering the clients 202-212. The backup/restore application 224 may send backup/restore work orders to the clients 202-212, which can receive and process the work orders to start a backup or restore operation. The backup/restore application 224 may maintain a local database of all processes that execute on the server 214. The backup/restore application 224 can execute server-side processes for a system administrator's graphical management console, which may enable the system administrator to use command line interface tools for queries. For example, a system administrator identifies the clients 202-212 registered with the server 214.

The server 214 includes a data compression optimizer 226 that optimizes the compression of data stored by the clients 202-212, data compression algorithms 228 that compress the data stored by the clients 202-212, and can include data compression metadata 230 that stores metadata which describes the compressing of the data originally stored by the clients 202-212. The data compression optimizer 226, the data compression algorithms 228, and the data compression metadata 230 may be separate components from the backup/restore application 224 or integrated modules within the backup/restore application 224. Although FIG. 2 depicts the backup/restore application 224, the data compression optimizer 226, the data compression algorithms 228, and the data compression metadata 230 residing completely on the server 214, the backup/restore application 224, the data compression optimizer 226, the data compression algorithms 228, and the data compression metadata 230 may reside in any combination of completely on the clients 202-212, and partially on the server 214 and partially on the clients 202-212. Even though the following paragraphs describe EMC Corporation's Avamar® backup/restore application and EMC Corporation's NetWorker® backup/restore application as examples of the backup/restore application 224, the backup/restore application 224 may be any other backup/restore application which provides the backup/restore functionalities described in the Background section.

The backup/restore application 224 may be EMC Corporation's Avamar® backup/restore application, which provides fast, efficient backup and recovery through a complete software and hardware solution. Equipped with integrated variable-length deduplication technology, EMC Corporation's Avamar® backup/restore application facilitates fast, periodic full backups for virtual environments, remote offices, enterprise applications, network access servers, and desktops/laptops. Data deduplication significantly reduces backup time by only storing unique periodic changes, while always maintaining periodic full backups for immediate single-step restore. The transmission of deduplicated backup sends only changed blocks, reducing network traffic. EMC Corporation's Avamar® backup/restore application leverages existing local area network and wide area network bandwidth for enterprise-wide and remote/branch office backup and recovery. Every backup is a full backup, which makes it easy for users to browse, point, and click for a single-step recovery. EMC Corporation's Avamar® data store features redundant power and networking, redundant array of independent disks, and redundant array of inexpensive nodes technology to provide uninterrupted data accessibility. Periodic data systems checks ensure recoverability whenever needed. EMC Corporation's Avamar® systems can be deployed in an integrated solution with EMC Corporation's Data Domain® systems for high-speed backup and recovery of specific data types.

The backup/restore application 224 may be an EMC Corporation's NetWorker® backup/restore application, which is a suite of enterprise level data protection software that unifies and automates backup to tape, disk-based, and flash-based storage media across physical and virtual environments for granular and disaster recovery. Cross-platform support is provided for many environments, including Microsoft Windows®. A central NetWorker® server manages a data zone that contains backup clients and NetWorker® storage nodes that access the backup media. The NetWorker® management console software provides a graphic user interface for functions such as client configuration, policy settings, schedules, monitoring, reports, and daily operations for deduplicated and non-deduplicated backups. The core NetWorker® software backs up client file systems and operating system environments. Add-on database and application modules provide backup services for products such as Microsoft® Exchange Server. Client backup data can be sent to a remote NetWorker® storage node or stored on a locally attached device by the use of a dedicated storage node. EMC Corporation's NetWorker® modules for Microsoft® applications supports Microsoft® products such as Microsoft® Exchange, Microsoft® Sharepoint, Microsoft® SQL Server, and Microsoft® Hyper-V servers.

The system 200 may pre-install the data compression algorithms 228, with tuning and fully testing that map to different data access patterns and scenarios, by using any public open-source data compression algorithms or any special purpose-built private data compression algorithms. The system 200 may include a supported algorithm table, such as the example depicted in Table 1 blow, with each supported data compression algorithm having a corresponding unique identifier, which are served via common application programming interfaces (APIs) with necessary parameters. Table 1 lists various widely-used data compression algorithms. Some data compression algorithms, such as ZLib, support various data compression levels, such that each data compression level could be considered as unique data compression algorithm and assigned a corresponding unique identifier.

TABLE 1 data compression algorithms

| Identifier | Algorithm | Optional parameters | Comments |
| --- | --- | --- | --- |
| 0 | None | | No data compression |
| 1 | Zstd | | Good balance |
| 2 | LZ4 | Work_buffer_size | Fast performance |
| 3 | ZLib | Specific level | Best compression ratio |
| ... | ... | ... | ... |

The system 200 stores the built-in knowledge about performance (data compression and data decompression) and general data compression ratios, which could be established proactively through comprehensive testing prior to initialization of the system 200. Table-1 may also store these characteristics. The Zstd data compression algorithm could be configured as the default choice due to its good balance in performance and compression ratio. The data compression algorithms 228 could be upgraded over time, such as upgrading existing data compression algorithms or adding new data compression algorithms, via a transparent and seamless non-disruptive upgrade.

The system 200 can enable a user to configure a data compression configuration. For example and with limitation, this can include the data compression optimizer 226 enabling a user to select the Zstd data compression algorithm as the default data compression algorithm for the system 200. The data compression configuration may configure a data chunk size, a time period associated with a data read count and/or a data write count, a parameter for determining a data compression status, a time period between changing from one data compression status to another data compression status, a trigger associated with storing a data chunk, a default data compression algorithm, a minimum data compression ratio requirement, a data compression granularity, and/or data compression metadata management.

The data compression optimizer 226 enables a user to configure the initial/default settings and/or running parameters. For example, a user can configure the default or initial data compression algorithm, such as Zstd, for a given persistent storage. The fine-grained subcomponents that have their data compressed (such as files, sub-files, objects, blocks, or sub-volumes) inherit the initial/default data compression algorithm. Over time, the data compression optimizer 226 automatically changes the initial/default data compression algorithm as needed to other data compression algorithms that correspond to the data access patterns for each data chunk. The user can configure data granularity, such as data chunk size, such as 1 megabyte (MB) to 64 MB, for a persistent storage. A larger granularity setting enables the use of less metadata, but coarser-grained optimization. A user may also configure the policy about whether and how often the data compression optimizer 226 automatically adjusts the data granularities. A user can also configure parameters such as data access pattern weights and switching criterion, such as a minimum data compression ratio 1× that indicates that data must be compressed to 50% of the size, otherwise data compression is turned off for a data chunk because storage efficiency gains are not sufficiently significant. In terms of short, medium, and long term, a user can configure that data access patterns on a given data chunk are automatically aggregated from short term to medium term and finally to long term. A user can configure a switching strategy, such that when a given switching criterion is met for a specific data chunk, the system 200 either immediately reads and re-compresses the specific data chunk or defers until the next write request for the specific data chunk. A user can configure metadata management, such as configuring the tracking of data access patterns as persistent (which means the user also needs to configure a data store for the tracking the data access patterns) or just keeping the tracked data access patterns in memory, such that the tracked data access patterns are reset after a reboot. The user can also configure which tracked data access patterns and decision information are displayed via a user interface.

Data can be the quantities, characters, or symbols on which operations are performed by a computer, being stored and transmitted in the form of electrical signals, and recorded on magnetic, optical, or mechanical recording media. A data compression algorithm can be a procedure that encodes information using less storage space than the original representation of the information. A default data compression algorithm can be a preselected procedure that encodes information using less storage space than the original representation of the information. Persistent storage can be any data retention device, or portion thereof, that retains data after power to that device is shut off. A user can be a person who operates a computer. A read request can be the act of asking for specific data to be retrieved from persistent storage. A write request can be the act of asking for specific data to be stored to persistent storage. A data read count can be a total number of the acts of asking for specific data to be retrieved from persistent storage during a time period. A data write count can be a total number of the acts of asking for specific data to be stored to persistent storage during a time period. A data compression configuration can be the arrangement or set-up of the software in a computer system that encodes information using less storage space than the original representation of the information. A data chunk can be an amount or part of information used by a computer. A data chunk size can be the overall dimensions or magnitude of an amount or part of information used by a computer. A time period can be a space of seconds, minutes, hours, days, weeks, months, or years with an established beginning and/or an established ending. A parameter can be a variable used in a subroutine that refers to one of the pieces of data provided as input to the subroutine. A data compression status can be the classification of information regarding the encoding of other information using less storage space than the original representation of the other information. A trigger can be anything that serves as a stimulus and initiates or precipitates a reaction. A minimum data compression ratio requirement can be the least numerical relationship needed between the storage space needed for the original representation of information and the storage space needed for the encoded information. A data compression granularity can be the scale of the storage space needed for encoded information. Data compression metadata management can be the process of dealing with a set of information that describes facts provided or learned about other information that is encoded using less storage space than the original representation of the information.

Following any user configurations, the system 200 determines a first data chunk and a second data chunk in a persistent storage. By way of example and without limitation, this can include the data compression optimizer 226 grouping data files 10-19 as a first data chunk, data files 20-29 as a second data chunk, data files 30-39 as a third data chunk, and data files 40-49 as a fourth data chunk in the data stored by the first disk 218. In an alternative example, the data compression optimizer 226 groups backup files 1010-1019 as a first data chunk and backup files 1020-1029 as a second data chunk in the backup files stored by the second disk 220. The data compression optimizer 226 logically breaks the target persistent storage into a fixed size or variable sizes of logical consecutive data chunks so that the data compression optimizer 226 can track the data access patterns for each data chunk. The size of each data chunk is configurable, such as 1 MB to 128 MB, and the default setting could be 32 MB.

Figure 4:
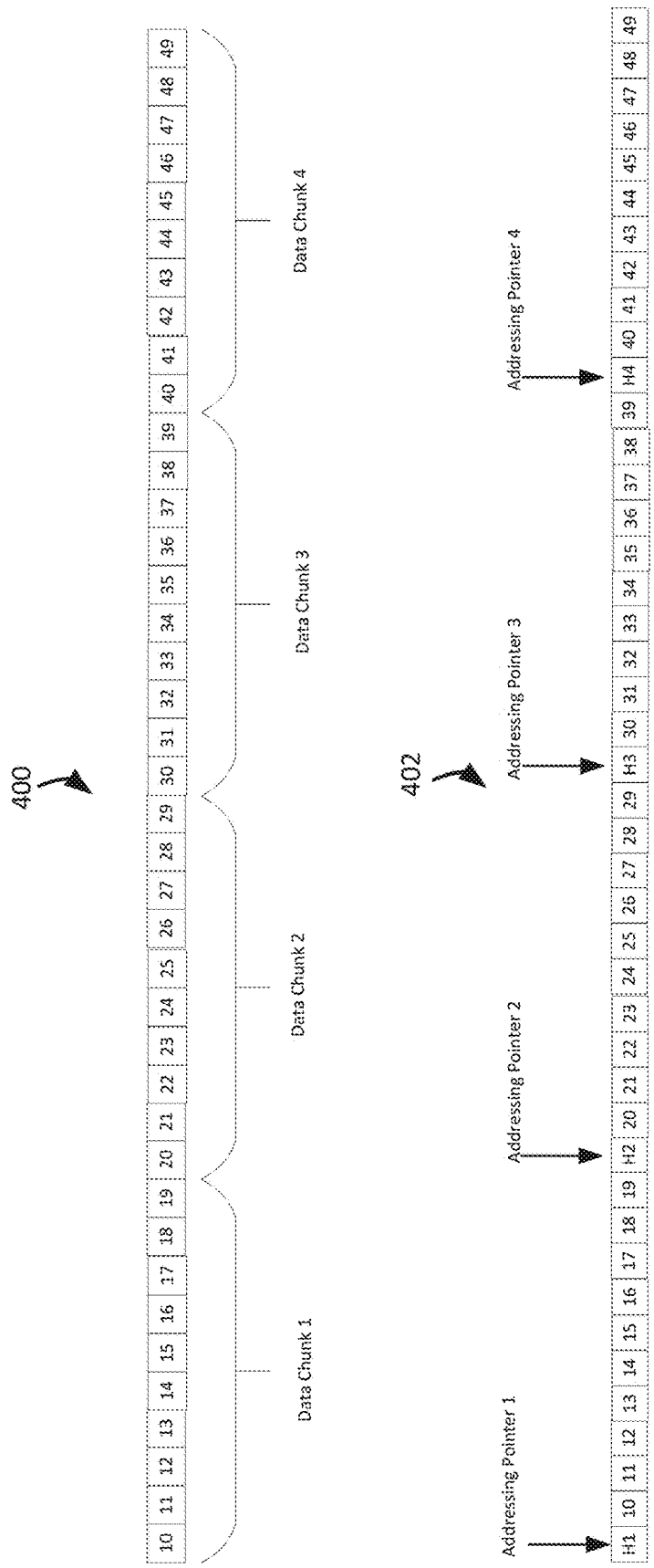
FIG. 4 illustrates block diagrams of example data chunks for transparent, fine-grained, and adaptive data compression, under an embodiment.

FIG. 4 illustrates block diagrams of example data chunks 400 for transparent, fine-grained, and adaptive data compression, under an embodiment. For this example, the data compression optimizer 226 logically breaks the first disk 218, which has a storage capacity of 1 terabyte (TB), into 1,000 data chunks of approximately 1 kilobyte (KB) each, including data chunk 1 that includes data files 10-19, data chunk 2 that includes data files 20-29, data chunk 3 that includes data files 30-39, and data chunk 4 that includes data files 40-49. Although this example describes the data compression optimizer 226 logically breaking a persistent storage which has a 1 TB storage capacity into 1,000 data chunks of approximately 1 KB each, with each data chunk including 10 data files with storage capacities of approximately 100 MB each, the data compression optimizer 226 may logically break persistent storage which has any storage capacity into any number of data chunks of any storage capacity, with the data chunks including any number of subcomponents with any storage capacity.

Since a data chunk is a logical granularity that the data compression optimizer 226 determines for the purposes of tracking data access patterns, a data chunk is independent of existing fixed or variable data compression granularities, such that a data chunk may function at an existing data compression granularity, such as a 4 KB or a 32 KB segment. However, if the corresponding policy is configured, the data compression optimizer 226 will collect the actual application input/output data access size within the data chunk, then the data compression optimizer 226 can adjust the data compression granularity to align with the actual application input/output data access size. For some high-level data structures like Btree, a data chunk may be defined as the number of neighbor sibling leaf tree nodes, such as 32 to 1,024 sibling nodes functioning as a logical data chunk.

Having determined data chunks, the system 200 determines a first data read count for the first data chunk and/or a first data write count for the first data chunk, and a second data read count for the second data chunk and/or a second data write count for the second data chunk. In embodiments, this can include the data compression optimizer 226 counting the data reads and the data writes for the data files 10-19, the data reads and the data writes for the data files 20-29, the data reads and the data writes for the data files 30-39, and the data reads and the data writes for the data files 40-49. Continuing this example, during the last 30 minutes the data compression optimizer 226 counted 11 data reads for the data file 10, 0 data reads for the data files 11-13, 13 data reads for the data file 14, 0 data reads for the data files 15-18, and 17 data reads for the data file 19, which total to 41 data reads for the first data chunk that includes the data files 10-19. Further to this example, during the last 30 minutes the data compression optimizer 226 counted 19 data writes for the data file 20, 0 data writes for the data files 21-24, 23 data writes for the data file 25, and 0 data writes for the data files 26-29, which total to 42 data writes for the second data chunk that includes the data files 20-29. In an alternative example, during the last 7 days the data compression optimizer 226 counted the data reads and the data writes for the backup files 1010-1019 and the data reads and the data writes for the backup files 1020-1029.

The data write count may include an initial data write count and/or a data re-write count. For example, a data write request for a data object that did not previously exist in persistent storage is an initial data write that requires the initial allocation of the data object, while a data re-write request is a request to modify the data value for a previously existing data object, which therefore requires no additional allocation of any data object. A data read count may include a partial data read count, which counts when a data read request spans the boundaries of consecutive data chunks, and a data write count may include a partial data write count, which counts when a data write request spans the boundaries of consecutive data chunks. A relatively high data read count and/or a relatively high data write count normally indicates that data compression will be optimized by higher data compression and/or decompression performance rather than an improvement in the current data compression ratio. The current data compression ratio can be the relationship between the original representation of information relative to the final storage space for the information, such as 2× or 4×.

The data compression optimizer 226 can update the data access patterns in a manner that is lightweight and fast, which the data compression optimizer 226 can perform in an out of bind fashion (such as by a separate thread) once the requested data access is complete, which can reduce the performance impact on normal data access. When the data compression optimizer 226 determines the data access patterns for a data chunk, the data compression optimizer 226 considers the data compression algorithms 228. Table 2 depicts example information for data access patterns:

TABLE 2

Typical data access pattern collected for each data chunk

| Data Access Pattern | Notation | Update |
| --- | --- | --- |
| Data Read Counter | Read counter per data chunk | at given time period, such as 30 minutes, 8 hours, or 7 days |
| Data Write Counter | Write counter per data chunk | at given time period, such as 30 minutes, 8 hours, or 7 days |
| Average Data Access Size | Average data access size per data chunk | |
| Average Data Compression Ratio | Average Data compression effect per data chunk | Average data compression ratio at a given time period |

The data compression optimizer 226 may keep two instances to determine changes in data access patterns, the stable previous data access patterns and the actively updating current data access patterns. The data compression optimizer 226 may keep updating the current data access patterns until an adjustment action triggers, after which the data compression optimizer 226 can incorporate the actively updating current data access patterns into the stable previous data access patterns. The data compression optimizer 226 may compare the actively updating current data access patterns with the stable previous data access patterns to match the data access patterns with the most appropriate data compression algorithms 228.

The data compression optimizer 226 may optimize the memory footprint of storing information for the data access patterns by enlarging the data access patterns' units. For example, if the minimum unit is 100 data writes, then 1 byte of a data write counter represents 256 multiplied by 100, and the data compression optimizer 226 stops increasing the data write counter when the count reaches 0xFF. Given an 800 TB system and setting of a 32 MB data chunk, the corresponding storage of information for data access patterns consume 100+MB of memory. The data compression optimizer 226 can keep the data access patterns information in the system's memory or store the data access patterns information to the system's persistent storage. The data compression optimizer 226 may also simultaneously maintain multiple time periods for the same counter, such as for the most recent 30 minutes, 8 hours, and 7 days, so that the data compression optimizer 226 may determine more insights into changes in data access patterns, at the cost in of additional storage space for data access patterns information in the system's memory and/or persistent storage.

After data access in the first data chunk is tracked, the system 200 determines a first data compression status for the first data chunk, based on the first data read count and/or the first data write count. For example and without limitation, this can include the data compression optimizer 226 determining that the LZ4 data compression algorithm is optimal for the data files 10-19 due to their relatively high read count, and the LZ4 data compression algorithm is optimal for the data files 20-29 due to their relatively high write count. In an alternative example, the data compression optimizer 226 determines that the LZ4 data compression algorithm is optimal for the backup files 1010-1019 due to their relatively high read and write counts If a user is concerned about a specific data access pattern more than other data access patterns, the data compression optimizer 226 may use various user-configured weights to determine a data compression status for a data chunk. For example, if the default weight for each tracked data access pattern is 1.0, and the user is more concerned about data write performance than data read performance, the user configures the weight for the data write counter as 1.5, which causes the data write counter to have a greater impact when the data compression optimizer 226 determines which data compression status is optimal for a corresponding data chunk. When the data compression optimizer 226 automatically determines a data compression status for a data chunk based on the data chunk's previous and/or current data access patterns, either the previously determined data compression status and/or the newly determined data compression status may specify the optimal data compression algorithm or no data compression for the data chunk.

In a replication situation, such as a typical asynchronous replication with one primary site and at least one standby site, the data access patterns in the source primary site may be different from the data access patterns in the standby sites. Depending on how replication is implemented (transparent to compression or not), the dataset at the primary site may or may not be transferred in a compressed data format, and the data compression optimizer 226 could independently track the data access patterns in the primary site and the standby site(s).

The data compression optimizer 226 may use any combination of different methods to determine the data compression status for a data chunk. For example, the data compression optimizer 226 compares the current data access patterns for a data chunk against the previous data access patterns for the data chunk, and adjusts the data compression status as necessary, without considering the data compression statuses for other data chunks. For this example, the data compression optimizer 226 uses the following formula's configurable weights and the data access patterns from Table 3.

$$\frac{RD_{IO_{cur}} - RD_{IO_{Prev}}}{RD_{IO_{Prev}}} \times W1 = \frac{WR_{IO_{cur}} - WR_{IO_{Prev}}}{WR_{IO_{Prev}}} \times W2 > C$$

TABLE 3 examples of changed data access patterns for a data chunk

| Data access patterns | Current value | Previous value | Difference |
|---|---|---|---|
| 1. Data read counter | 1000 | 100 | 900 |
| 2. Data write counter | 500 | 600 | −100 |
| 3. Data compression ratio | 3.5 | 4.0 | −0.5 |

Since the read data counter increases significantly for a data chunk, the data compression optimizer 226 determines that the new data compression status for the data chunk specifies a new data compression algorithm that has a better data read speed than the data read speed of the previous data compression algorithm specified by the previous data compression status for the data chunk. If W1=W2=100% and C=5, then 900/100+(−100)/600=8.83>5. Thus, the data compression optimizer 226 triggers a switch from the default Zstd data compression algorithm with the 940 MB/second data decompression speed to the LZ4 data compression algorithm with the 3,100 MB/second data decompression speed. If the data compression status for the data chunk already specifies the LZ4 data compression algorithm, and no data compression algorithm with a better data decompression speed is available, then the data compression optimizer 226 may change the data compression status for the data chunk to specify that no data compression is to be performed on the data chunk.

In another example, the data compression optimizer 226 compares the data access patterns for a data chunk that is being evaluated to the data access patterns for other data chunks, thereby creating a relative ranking for the data chunks before determining the data compression statuses for all data chunks. In yet another example, the data compression optimizer 226 uses various weight settings to combine the comparison of the current data access patterns for a data chunk against the previous data access patterns for the same data chunk with the comparison the data access patterns for the data chunk that is being evaluated to the data access patterns for other data chunks. Similarly, a user could define a policy about data compression ratios which indicates whether a data chunk is compressible or not. For example, if the average data compression ratio<criterion for a given period, such as 1 day, then this indicates that the data chunk is difficult to compress, such as due to random or unique data. In this situation, the data compression optimizer 226 may change the data compression status for the data chunk to specify that the data chunk will not be compressed when written to persistent storage. If another policy is enabled, the data compression optimizer 226 may adjust the actual data compression granularity. For example, if the data compression optimizer 226 determined that the average size of the data accessed in a data chunk was 64 KB, and the current data compression size is configured as 8 KB, then the data compression optimizer 226 adjusts the current data compression size to be 64 KB. To avoid unnecessary or frequent changes in the data compression status and/or data compression settings, the data compression optimizer 226 may consider the timing window, such as skipping a potential change if the potential change is too close in time to the previous change, such as a configurable minimum 1 hour interval between changes.

Following the tracking of data access patterns for the second data chunk, the system 200 determines a second data compression status for the second data chunk, based on the second data read count and/or the second data write count, the second data compression status differing from the first data compression status. By way of example and without limitation, this can include the data compression optimizer 226 determining that the Zlib data compression algorithm is optimal for the data files 30-39 due to their relatively low read and write counts, and no data compression is optimal for the data files 40-49 in the fourth data chunk due to its relatively high read and write counts combined with its relatively low data compression ratios. This example illustrates that determining a data compression status for a data chunk may be further based on a data compression ratio for the data chunk and/or a data access size for the data chunk. In an alternative example, the data compression optimizer 226 determines that the Zlib data compression algorithm is optimal for the backup files 1020-1029 due to their relatively low write count.

Having determined the optimal data compression status for each data chunk, the system 200 stores data in the first data chunk to the persistent storage, based on the first data compression status. In embodiments, this can include the data compression optimizer 226 launching new dedicated background threads that use the LZ4 data compression algorithm to retrieve, recompress, and store the data files 10-19 and the data files 20-29. In an alternative example, the data compression optimizer 226 launches new dedicated background threads that use the LZ4 data compression algorithm to retrieve, recompress, and store the backup files 1010-1019. Storing the data in the first data chunk and/or the data in the second data chunk to the persistent storage may be triggered by at least one corresponding data compression status determination, at least one delayed background execution following at least one corresponding data compression status determination, and/or at least one corresponding data access request. For example, once the data compression optimizer 226 decides to change a data compression status for a data chunk, the data compression optimizer 226 could apply the new data compression status to the data chunk based on different configurable options. The data compression optimizer 226 could apply the new data compression status to the data chunk immediately. For example, the data compression optimizer 226 launches new dedicated background thread(s) to either re-compress the data chunk and store the recompressed data chunk to persistent storage if the data chunk is already in memory, or retrieve the data chunk from persistent memory, decompress the retrieved data chunk, re-compress the data chunk, and store the recompressed data chunk to persistent storage if the data chunk is not already in memory. The data compression optimizer 226 may assign a low priority when scheduling the immediate application of a new data compression status because such an immediate application may consume a significant amount of system resources. The data compression optimizer 226 could apply the new data compression status to the data chunk in response to receiving the next read request or write request for the corresponding data chunk, such that the re-compression of the corresponding data chunk is on-demand. The data compression optimizer 226 could apply the new data compression status to the data chunk by a combination of the immediate application and the on-demand application, by re-compressing requested data chunks on demand while using background threads to continuously re-compress the other data chunks. In some situations, the data compression optimizer 226 could skip the application of the new data compression status for a data chunk, and continue to apply the previous data compression status to the data chunk.

The data compression optimizer 226 can maintain and update relevant metadata so that data-accessing applications can encode and decode data correctly. The metadata may include information on the specific data compression algorithms, the data length, etc. The data compression optimizer 226 can store this metadata in a separate data store (such as files or a database), which may cause the consumption of additional system resources to lookup the data compression metadata 230. The data compression optimizer 226 can store this metadata in an embedded fashion by a purpose-design layout. FIG. 4 illustrates an example embedded and self-contained metadata 402 which is compact and efficient. The data compression optimizer 226 can embed data compression status bits within the upper level addressing pointer (such as a file's indirect block or tree/hash structure pointers), such as addressing pointer 1 which points to header H1, addressing pointer 2 which points to header H2, addressing pointer 3 which points to header H3, and addressing pointer 4 which points to header H4. Setting the data compression status bits in an addressing pointer to the value 0 may indicate no data compression for the corresponding data chunk, and setting the data compression status bits in an addressing pointer to other values may correspond to specific data compression algorithms for the corresponding data chunk, such as indicated in Table 1 above, which uses 2 bits to specify 3 supported data compression algorithms. The data compression optimizer 226 can create a fixed-length header and embed a header before the beginning of each data chunk to provide more detailed data compression information for the corresponding data chunk. Table 4 describes a possible header design of 8 bytes, which is very compact and efficient.

TABLE 4 self-contained header layout per data chunk

| Header Field | Field size | Field value |
| --- | --- | --- |
| Data compression status | 2 bits | 0: off; 1: Zstd; 2: LZ4, 3: Zlib |
| Version | 5 bits | 32 revisions |
| Actual Length (in sector) | 16 bits | Maximum compressed chunk size is 32 MB |
| Cyclical Redundancy Check | 32 bits | |
| Reserved | 9 bits | May set as actual data compression granularity in the corresponding data chunk, such as 32 KB |

Consequently, the metadata for one data chunk can be independent of the metadata for any other data chunk, even when the data compression optimizer 226 mixes and uses various data compression algorithms for any given persistent storage. Each data-accessing application can transparently use the metadata for each data chunk, and correctly determine each data chunk's data compression status through the corresponding addressing pointer's compression-bit and header, then compress or decompress the requested data independently. When a data compression status changes, the data compression optimizer 226 modifies the corresponding addressing pointer's data compression bits and the corresponding header. Given a new data write request for a data chunk, the data compression optimizer 226 identifies the data compression algorithm from the addressing pointer's data compression bits for the data chunk, uses the identified data compression algorithm to compress the requested data, and updates the addressing pointer's data compression bits and the header for the data chunk. Given a new data read request for a data chunk, the data compression optimizer 226 identifies the previous data compression algorithm from the addressing pointer's data compression bits for the data chunk, uses the previous data compression algorithm to decompress the requested data, and updates the addressing pointer's data compression bits and the header for the data chunk so that the data chunk can be compressed and stored based on the new data compression status.

After determination of the optimal data compression status for each data clunk, the system 200 stores data in the second data chunk to the persistent storage, based on the second data compression status. For example and without limitation, this can include the data compression optimizer 226 launching new dedicated background threads that use the Zlib data compression algorithm to retrieve, recompress, and store the data files 30-39, and use no data compression algorithm to retrieve, recompress, and store the data files 40-49. In an alternative example, the data compression optimizer 226 launches new dedicated background threads that use the Zlib data compression algorithm to retrieve, recompress, and store the backup files 1020-1029.

Following the optimal storage of data chunks, the system 200 can retrieve, based on the first data compression status, first data from the first data chunk in the persistent storage in response to a read request associated with the first data. By way of example and without limitation, this can include the data compression optimizer 226 using the LZ4 data compression algorithm to retrieve and decompress the data file 11 in response to a read request for the data file 11. In an alternative example, the data compression optimizer 226 uses the LZ4 data compression algorithm to retrieve and decompress the backup file 1012 in response to a read request for the backup file 1012.

Once the data chunks are optimally stored, the system 200 retrieves, based on the second data compression status, second data from the second data chunk in the persistent storage in response to a read request associated with the second data. In embodiments, this can include the data compression optimizer 226 using the LZ4 data compression algorithm to retrieve and decompress the data file 22 in response to a read request for the data file 22. In an alternative example, the data compression optimizer 226 uses the Zlib data compression algorithm to retrieve and decompress the backup file 1021 in response to a read request for the backup file 1021.

Figure 3:
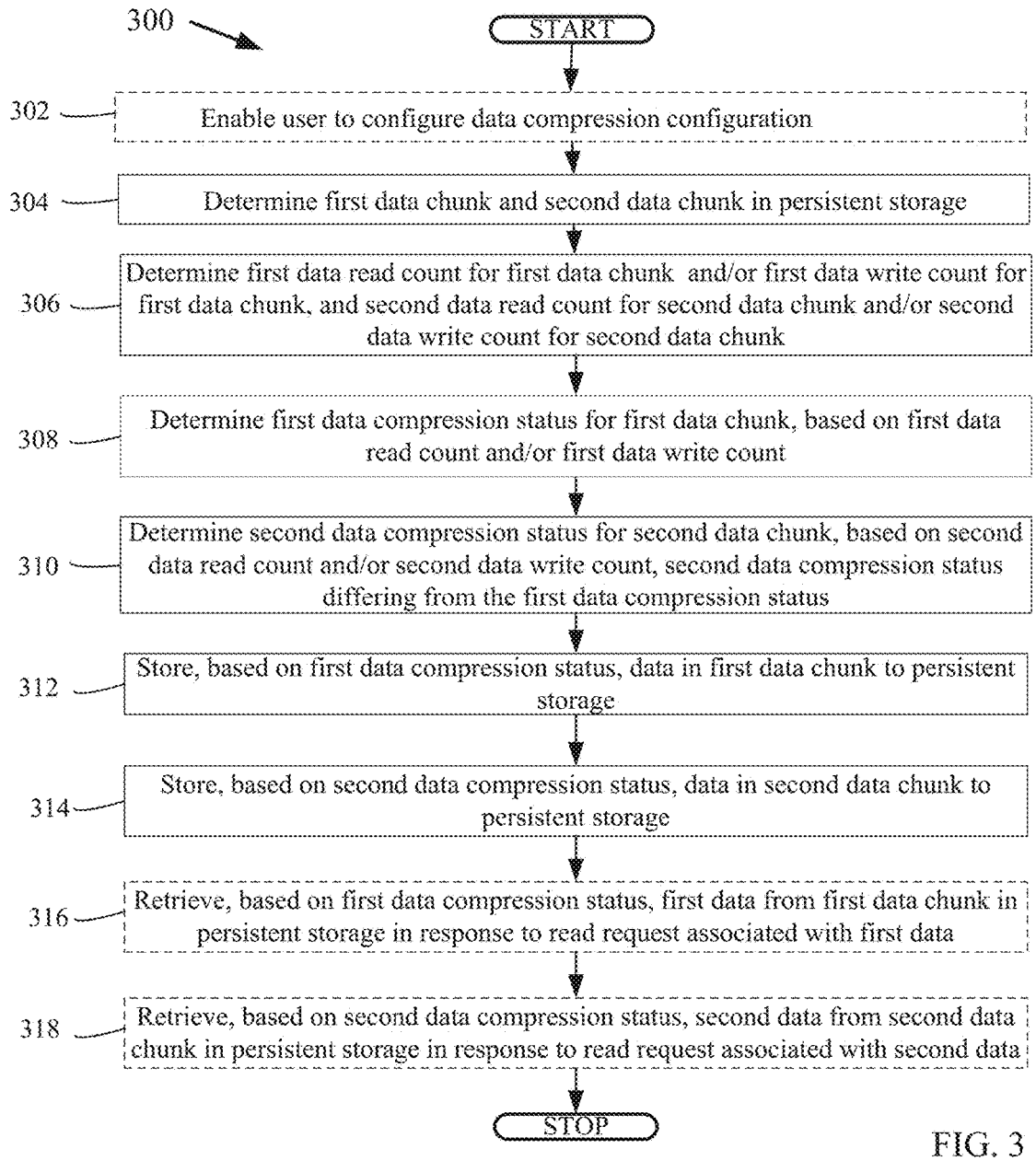
FIG. 3 is a flowchart that illustrates an example method of transparent, fine-grained, and adaptive data compression, under an embodiment.

FIG. 3 is a flowchart that illustrates a method for transparent, fine-grained, and adaptive data compression, under an embodiment. Flowchart 300 illustrates method acts illustrated as flowchart blocks for certain steps involved in and/or between the clients 202-212 and/or the server 214 of FIG. 2.

A user is optionally enabled to configure a data compression configuration, block 302. The system 200 enables a user to configure optimal data compression for the user. For example and with limitation, this can include the data compression optimizer 226 enabling a user to select the Zstd data compression algorithm as the default data compression algorithm for the system 200.

Following any user configurations, a first data chunk and a second data chunk are determined in a persistent storage, block 304. The system 200 determines data chunks which will have their data access patterns tracked to enable optimal data compression. By way of example and without limitation, this can include the data compression optimizer 226 grouping data files 10-19 as a first data chunk, data files 20-29 as a second data chunk, data files 30-39 as a third data chunk, and data files 40-49 as a fourth data chunk in the data stored by the first disk 218.

Having determined data chunks, determinations are made of a first data read count for the first data chunk and/or a first data write count for the first data chunk, and a second data read count for the second data chunk and/or a second data write count for the second data chunk, block 306. The system 200 tracks data access patterns for the data chunks to enable optimal data compression. In embodiments, this can include the data compression optimizer 226 counting the data reads and the data writes for the data files 10-19, the data reads and the data writes for the data files 20-29, the data reads and the data writes for the data files 30-39, and the data reads and the data writes for the data files 40-49.

After data access patterns are tracked for the first data chunk, a first data compression status is determined for the first data chunk, based on the first data read count and/or the first data write count, block 308. The system 200 determines the optimal data compression status for each tracked data access pattern. For example and without limitation, this can include the data compression optimizer 226 determining the LZ4 data compression algorithm as optimal for the data files 10-19 due to their relatively high read count, and the LZ4 data compression algorithm as optimal for the data files 20-29 due to their relatively high write count.

Following the tracking of data access patterns for the second data chunk, a second data compression status is determined for the second data chunk, based on the second data read count and/or the second data write count, the second data compression status differing from the first data compression status, block 310. The system 200 determines the optimal data compression status for each data chunk. By way of example and without limitation, this can include the data compression optimizer 226 determining that the Zlib data compression algorithm is optimal for the data files 30-39 due to their relatively low read and write counts, and no data compression is optimal for the data files 40-49 in the fourth data chunk due to its relatively high read and write counts combined with its relatively low data compression ratios.

Having determined the optimal data compression status for each data chunk, data in the first data chunk is stored to the persistent storage, based on the first data compression status, block 312. The system 200 stores each data chunk based on its corresponding optimal data compression status. In embodiments, this can include the data compression optimizer 226 launching new dedicated background threads that use the LZ4 data compression algorithm to retrieve, recompress, and store the data files 10-19 and the data files 20-29.

After determination of the optimal data compression status for each data chunk, data in the second data chunk is stored to the persistent storage, based on the second data compression status, block 314. The system 200 stores each data chunk based on its corresponding optimal data compression status. For example and without limitation, this can include the data compression optimizer 226 launching new dedicated background threads that use the Zlib data compression algorithm to retrieve, recompress, and store the data files 30-39, and use no data compression algorithm to retrieve, recompress, and store the data files 40-49.

Following the optimal storage of data chunks, first data is optionally retrieved, based on the first data compression status, from the first data chunk in the persistent storage in response to a read request associated with the first data, block 316. The system 200 retrieves data chunks based on their corresponding optimal data compression status. By way of example and without limitation, this can include the data compression optimizer 226 using the LZ4 data compression algorithm to retrieve and decompress the data file 11 in response to a read request for the data file 11.

Once the data chunks are optimally stored, second data is optionally retrieved, based on the second data compression status, from the second data chunk in the persistent storage in response to a read request associated with the second data, block 318. The system 200 retrieves data chunks based on their corresponding optimal data compression status. In embodiments, this can include the data compression optimizer 226 using the LZ4 data compression algorithm to retrieve and decompress the data file 22 in response to a read request for the data file 22.

Although FIG. 3 depicts the blocks 302-318 occurring in a specific order, the blocks 302-318 may occur in another order. In other implementations, each of the blocks 302-318 may also be executed in combination with other blocks and/or some blocks may be divided into a different set of blocks.

Figure 5:
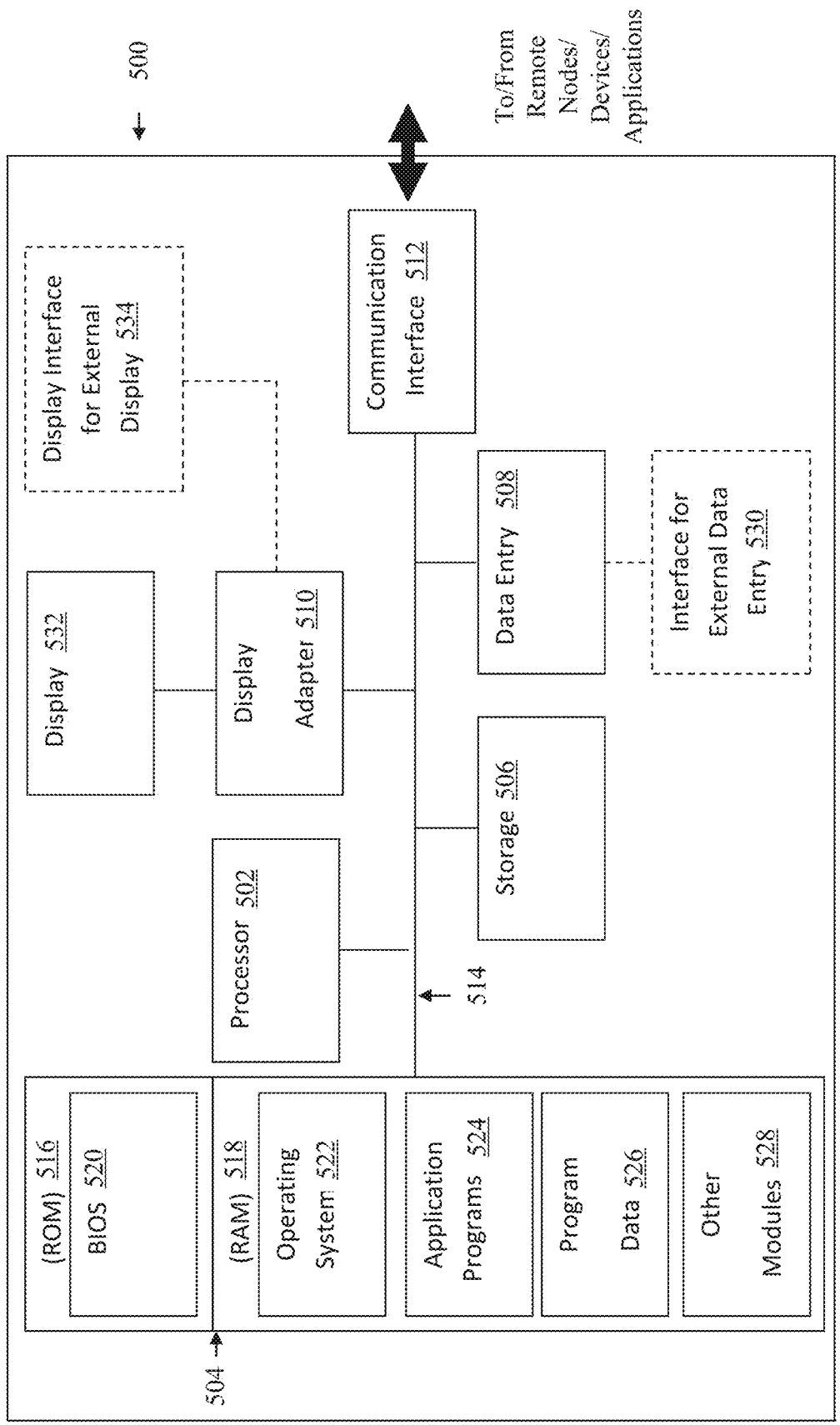
FIG. 5 is a block diagram illustrating an example hardware device in which the subject matter may be implemented.

Having describing the subject matter in detail, an exemplary hardware device in which the subject matter may be implemented shall be described. Those of ordinary skill in the art will appreciate that the elements illustrated in FIG. 5 may vary depending on the system implementation. With reference to FIG. 5, an exemplary system for implementing the subject matter disclosed herein includes a hardware device 500, including a processing unit 502, memory 504, storage 506, a data entry module 508, a display adapter 510, a communication interface 512, and a bus 514 that couples the elements 504-512 to the processing unit 502.

The bus 514 may comprise any type of bus architecture. Examples include a memory bus, a peripheral bus, a local bus, etc. The processing unit 502 is an instruction execution machine, apparatus, or device and may comprise a microprocessor, a digital signal processor, a graphics processing unit, an application specific integrated circuit (ASIC), a field programmable gate array (FPGA), etc. The processing unit 502 may be configured to execute program instructions stored in the memory 504 and/or the storage 506 and/or received via the data entry module 508.

The memory 504 may include read only memory (ROM) 516 and random access memory (RAM) 518. The memory 504 may be configured to store program instructions and data during operation of the hardware device 500. In various embodiments, the memory 504 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. The memory 504 may also include nonvolatile memory technologies such as nonvolatile flash RAM (NVRAM) or ROM. In some embodiments, it is contemplated that the memory 504 may include a combination of technologies such as the foregoing, as well as other technologies not specifically mentioned. When the subject matter is implemented in a computer system, a basic input/output system (BIOS) 520, containing the basic routines that help to transfer information between elements within the computer system, such as during start-up, is stored in the ROM 516.

The storage 506 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 500.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 506, the ROM 516 or the RAM 518, including an operating system 522, one or more applications programs 524, program data 526, and other program modules 528. A user may enter commands and information into the hardware device 500 through the data entry module 508. The data entry module 508 may include mechanisms such as a keyboard, a touch screen, a pointing device, etc. Other external input devices (not shown) are connected to the hardware device 500 via an external data entry interface 530. By way of example and not limitation, external input devices may include a microphone, joystick, game pad, satellite dish, scanner, or the like. In some embodiments, external input devices may include video or audio input devices such as a video camera, a still camera, etc. The data entry module 508 may be configured to receive input from one or more users of the hardware device 500 and to deliver such input to the processing unit 502 and/or the memory 504 via the bus 514.

A display 532 is also connected to the bus 514 via the display adapter 510. The display 532 may be configured to display output of the hardware device 500 to one or more users. In some embodiments, a given device such as a touch screen, for example, may function as both the data entry module 508 and the display 532. External display devices may also be connected to the bus 514 via an external display interface 534. Other peripheral output devices, not shown, such as speakers and printers, may be connected to the hardware device 500.

The hardware device 500 may operate in a networked environment using logical connections to one or more remote nodes (not shown) via the communication interface 512. The remote node may be another computer, a server, a router, a peer device or other common network node, and typically includes many or all of the elements described above relative to the hardware device 500. The communication interface 512 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, the communication interface 512 may include logic configured to support direct memory access (DMA) transfers between the memory 504 and other devices.

In a networked environment, program modules depicted relative to the hardware device 500, or portions thereof, may be stored in a remote storage device, such as, for example, on a server. It will be appreciated that other hardware and/or software to establish a communications link between the hardware device 500 and other devices may be used.

It should be understood that the arrangement of the hardware device 500 illustrated in FIG. 5 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of the hardware device 500.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 5.

Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description herein, the subject matter is described with reference to acts and symbolic representations of operations that are performed by one or more devices, unless indicated otherwise. As such, it is understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is described in this context, it is not meant to be limiting as those of skill in the art will appreciate that various of the acts and operations described herein may also be implemented in hardware.

To facilitate an understanding of the subject matter described, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A system comprising:
a processor-based application stored on a non-transitory computer-readable medium, which when executed on a computer, will cause one or more processors to:
determine a first data chunk and a second data chunk in a persistent storage;
determine at least one of a first data read count for the first data chunk and a first data write count for the first data chunk, and at least one of a second data read count for the second data chunk and a second data write count for the second data chunk;
determine a first data compression status for the first data chunk based on at least one of the first data read count and the first data write count;
determine a second data compression status for the second data chunk based on at least one of the second data read count and the second data write count, the second data compression status differing from the first data compression status;
store, based on the first data compression status, data in the first data chunk to the persistent storage; and
store, based on the second data compression status, data in the second data chunk to the persistent storage.

2. The system of claim 1, the processor-based application further causes the one or more processors to enable a user to configure a data compression configuration, wherein the data compression configuration comprises at least one of at least one data chunk size, a time period associated with at least one of at least one data read count and at least one data write count, a parameter for determining the first data compression status, a parameter for determining the second data compression status, a time period between changing from one data compression status to another data compression status, a trigger associated with storing at least one data chunk, a default data compression algorithm, a minimum data compression ratio requirement, a data compression granularity, and data compression metadata management.

3. The system of claim 1, wherein determining the first data compression status for the first data chunk is further based on at least one of a first data compression ratio for the first data chunk and a first data access size for the first data chunk, and determining the second data compression status for the second data chunk is further based on at least one of a second data compression ratio for the second data chunk and a second data access size for the second data chunk.

4. The system of claim 1, wherein storing the data in the first data chunk to the persistent storage comprises a first data compression algorithm compressing data in the first data chunk, and storing the data in the second data chunk to the persistent storage comprises a second data compression algorithm compressing the data in the second data chunk, the first data compression algorithm differing from the second data compression algorithm.

5. The system of claim 1, wherein storing at least one of the data in the first data chunk and the data in the second data chunk to the persistent storage is triggered by at least one of at least one corresponding data compression status determination, at least one delayed background execution following at least one corresponding data compression status determination, and at least one corresponding data access request.

6. The system of claim 1, wherein the processor-based application further causes the one or more processors to
retrieve, based on the first data compression status, first data from the first data chunk in the persistent storage in response to a read request associated with the first data; and
retrieve, based on the second data compression status, second data from the second data chunk in the persistent storage in response to a read request associated with the second data.

7. The system of claim 6, wherein retrieving the first data from the first data chunk in the persistent storage comprises a first data compression algorithm decompressing the retrieved first data, and retrieving the second data from the second data chunk in the persistent storage comprises a second data compression algorithm decompressing the retrieved second data, the first data compression algorithm differing from the second data compression algorithm.

8. A computer-implemented method for transparent, fine-grained, and adaptive data compression, the method comprising:
determining a first data chunk and a second data chunk in a persistent storage;
determining at least one of a first data read count for the first data chunk and a first data write count for the first data chunk, and at least one of a second data read count for the second data chunk and a second data write count for the second data chunk;
determining a first data compression status for the first data chunk based on at least one of the first data read count and the first data write count;
determining a second data compression status for the second data chunk based on at least one of the second data read count and the second data write count, the second data compression status differing from the first data compression status;
storing, based on the first data compression status, data in the first data chunk to the persistent storage; and
storing, based on the second data compression status, data in the second data chunk to the persistent storage.

9. The method of claim 8, wherein the method further comprises enabling a user to configure a data compression configuration, wherein the data compression configuration comprises at least one of at least one data chunk size, a time period associated with at least one of at least one data read count and at least one data write count, a parameter for determining the first data compression status, a parameter for determining the second data compression status, a time period between changing from one data compression status to another data compression status, a trigger associated with storing at least one data chunk, a default data compression algorithm, a minimum data compression ratio requirement, a data compression granularity, and data compression metadata management.

10. The method of claim 8, wherein determining the first data compression status for the first data chunk is further based on at least one of a first data compression ratio for the first data chunk and a first data access size for the first data chunk, and determining the second data compression status for the second data chunk is further based on at least one of a second data compression ratio for the second data chunk and a second data access size for the second data chunk.

11. The method of claim 8, wherein storing the data in the first data chunk to the persistent storage comprises a first data compression algorithm compressing data in the first data chunk, and storing the data in the second data chunk to the persistent storage comprises a second data compression algorithm compressing the data in the second data chunk, the first data compression algorithm differing from the second data compression algorithm.

12. The method of claim 8, wherein storing at least one of the data in the first data chunk and the data in the second data chunk to the persistent storage is triggered by at least one of at least one corresponding data compression status determination, at least one delayed background execution following at least one corresponding data compression status determination, and at least one corresponding data access request.

13. The method of claim 8, wherein the method further comprises:
retrieving, based on the first data compression status, first data from the first data chunk in the persistent storage in response to a read request associated with the first data; and
retrieving, based on the second data compression status, second data from the second data chunk in the persistent storage in response to a read request associated with the second data.

14. The method of claim 13, wherein retrieving the first data from the first data chunk in the persistent storage comprises a first data compression algorithm decompressing the retrieved first data, and retrieving the second data from the second data chunk in the persistent storage comprises a second data compression algorithm decompressing the retrieved second data, the first data compression algorithm differing from the second data compression algorithm.

15. A computer program product, comprising a non-transitory computer-readable medium having a computer-readable program code embodied therein to be executed by one or more processors, the program code including instructions to:
determine a first data chunk and a second data chunk in a persistent storage;
determine at least one of a first data read count for the first data chunk and a first data write count for the first data chunk, and at least one of a second data read count for the second data chunk and a second data write count for the second data chunk;
determine a first data compression status for the first data chunk based on at least one of the first data read count and the first data write count;
determine a second data compression status for the second data chunk based on at least one of the second data read count and the second data write count, the second data compression status differing from the first data compression status;
store, based on the first data compression status, data in the first data chunk to the persistent storage; and
store, based on the second data compression status, data in the second data chunk to the persistent storage.

16. The computer program product of claim 15, wherein the program code includes further instructions to enable a user to configure a data compression configuration, wherein the data compression configuration comprises at least one of at least one data chunk size, a time period associated with at least one of at least one data read count and at least one data write count, a parameter for determining the first data compression status, a parameter for determining the second data compression status, a time period between changing from one data compression status to another data compression status, a trigger associated with storing at least one data chunk, a default data compression algorithm, a minimum data compression ratio requirement, a data compression granularity, and data compression metadata management.

17. The computer program product of claim 15, wherein determining the first data compression status for the first data chunk is further based on at least one of a first data compression ratio for the first data chunk and a first data access size for the first data chunk, and determining the second data compression status for the second data chunk is further based on at least one of a second data compression ratio for the second data chunk and a second data access size for the second data chunk.

18. The computer program product of claim 15, wherein storing the data in the first data chunk to the persistent storage comprises a first data compression algorithm compressing data in the first data chunk, and storing the data in the second data chunk to the persistent storage comprises a second data compression algorithm compressing the data in the second data chunk, the first data compression algorithm differing from the second data compression algorithm.

19. The computer program product of claim 15, wherein storing at least one of the data in the first data chunk and the data in the second data chunk to the persistent storage is triggered by at least one of at least one corresponding data compression status determination, at least one delayed background execution following at least one corresponding data compression status determination, and at least one corresponding data access request.

20. The computer program product of claim 15, wherein the program code includes further instructions to:
retrieve, based on the first data compression status, first data from the first data chunk in the persistent storage in response to a read request associated with the first data; and
retrieve, based on the second data compression status, second data from the second data chunk in the persistent storage in response to a read request associated with the second data, wherein retrieving the first data from the first data chunk in the persistent storage comprises a first data compression algorithm decompressing the retrieved first data, and retrieving the second data from the second data chunk in the persistent storage comprises a second data compression algorithm decompressing the retrieved second data, the first data compression algorithm differing from the second data compression algorithm.

* * * * *